United States Patent
Tracy et al.

(10) Patent No.: US 9,060,004 B1
(45) Date of Patent: Jun. 16, 2015

(54) SYSTEMS AND METHODS FOR MAINTAINING LOCATION-AWARE VIRTUALIZATION LAYERS

(75) Inventors: Scott Tracy, Pleasant Grove, UT (US); Bradley Baird, Orem, UT (US)

(73) Assignee: Symantec Corporation, Mountain View, CA (US)

( * ) Notice: Subject to any disclaimer, the term of this patent is extended or adjusted under 35 U.S.C. 154(b) by 335 days.

(21) Appl. No.: 13/298,032

(22) Filed: Nov. 16, 2011

(51) Int. Cl.
  *G06F 15/16* (2006.01)
  *H04L 29/06* (2006.01)
  *G06F 21/62* (2013.01)

(52) U.S. Cl.
  CPC .......... *H04L 63/107* (2013.01); *G06F 21/6218* (2013.01)

(58) Field of Classification Search
  CPC ....... H04L 63/10; H04L 63/107; H04L 63/16; H04L 63/102; G06F 21/30; G06F 21/6218
  USPC .............. 726/1, 2, 15, 27; 713/166, 150, 151; 709/217–229; 717/168–178
  See application file for complete search history.

(56) References Cited

U.S. PATENT DOCUMENTS

| | | | |
|---|---|---|---|
| 7,117,495 B2 | 10/2006 | Blaser et al. | |
| 7,162,724 B2 | 1/2007 | Blaser et al. | |
| 7,165,260 B2 | 1/2007 | Blaser et al. | |
| 2009/0307611 A1* | 12/2009 | Riley | 715/757 |
| 2010/0064340 A1* | 3/2010 | McCorkendale et al. | 726/1 |
| 2010/0082487 A1* | 4/2010 | Nelsen | 705/44 |
| 2010/0229169 A1* | 9/2010 | Bunnell et al. | 718/1 |
| 2012/0054355 A1* | 3/2012 | Arrasvuori et al. | 709/229 |
| 2012/0198570 A1* | 8/2012 | Joa et al. | 726/30 |

* cited by examiner

*Primary Examiner* — Nirav B Patel
(74) *Attorney, Agent, or Firm* — ALG Intellectual Property, LLC (57) ABSTRACT

A computer-implemented method may include 1) maintaining an application virtualization subsystem on a computing system having a base file system and base registry of a base operating system, 2) installing an application and/or data to a virtualization layer on the computing system without changing the base file system and/or base registry such that the virtualization layer is isolated from the base file system and/or base registry, 3) identifying a current geographical location of the computing system, and 4) determining, based on the current geographical location of the computing system, whether the virtualization layer should be enabled such that access attempts associated with the application and/or data are redirected to the virtualization layer or should be disabled such that access attempts associated with the application and/or data are allowed to pass through to the base file system and/or base registry. Various other methods, systems, and computer-readable media are also disclosed.

20 Claims, 8 Drawing Sheets

SYSTEMS AND METHODS FOR MAINTAINING LOCATION-AWARE VIRTUALIZATION LAYERS

CROSS REFERENCES TO RELATED APPLICATIONS

This application is related to U.S. Pat. No. 7,162,724 filed 11 Jun. 2003 and titled "Layered Computing Systems and Methods", U.S. Pat. No. 7,117,495 filed 11 Jun. 2003 and titled "Systems and Methods for the Creation of Software Packages Using Layered Systems", and U.S. Pat. No. 7,165,260 filed 11 Jun. 2003 and titled "Layered Computing Systems and Methods for Insecure Environments", the disclosures of each of which are incorporated, in their entirety, by this reference.

BACKGROUND

With the growing trend of employees using their own personal devices for work purposes, it has become increasing difficult for Information Technology ("IT") administrators of enterprises to control and provision company resources. Many IT administrators turn to virtualization technologies to quickly provision computing devices with applications and/or settings. However, traditional virtualization technologies do not adequately handle security, confidentiality, and legality issues that may be associated with the use of a company's systems and/or data. What is needed, therefore, is a mechanism that enables IT administrators and others to more efficiently and effectively provision and control computing systems.

SUMMARY

As will be described in greater detail below, the instant disclosure generally relates to systems and methods for maintaining location-aware virtualization layers. In one example, a computer-implemented method for maintaining location-aware virtualization layers may include 1) maintaining an application virtualization subsystem on a computing system having a base file system and base registry of a base operating system, 2) installing an application and/or data to a virtualization layer on the computing system without changing the base file system and/or base registry such that the virtualization layer is isolated from the base file system and/or base registry, 3) identifying a current geographical location of the computing system, and 4) determining, based on the current geographical location of the computing system, whether the virtualization layer should be enabled such that access attempts associated with the application and/or data are redirected to the virtualization layer or should be disabled such that access attempts associated with the application and/or data are allowed to pass through to the base file system and/or base registry.

In some embodiments the method may also include maintaining a virtualization-layer activation policy that associates a geographical location with the application and/or data in the virtualization layer. In such embodiments, determining whether the virtualization layer should be activated or deactivated may include determining whether the current geographical location of the computing system is within the geographical location associated with the application and/or data in the virtualization layer.

According to various embodiments, the method may include enabling the virtualization layer if the current location of the computing system is within the geographical location associated with the application and/or data in the virtualization layer and disabling the virtualization layer if the current location of the computing system is not within the geographical location associated with the application and/or data in the virtualization layer.

Additionally or alternatively, the method may include identifying an attempt to access the application and/or data in the virtualization layer, where determining whether the virtualization layer should be enabled or disabled is performed in response to the attempt to access the application and/or data in the virtualization layer.

In some examples, identifying the attempt to access the application in the virtualization layer may include detecting an attempt to launch the application, determining whether the virtualization layer should be enabled or disabled may include determining that the virtualization layer should be enabled because the current geographical location of the computing system is within a geographical location where the application is allowed to run, and the method may further include enabling the virtualization layer to allow the application to launch.

According to certain embodiments, the method may further include determining that the computing system is no longer within the geographical location where the application is allowed to run and, in response to determining that the computing system is no longer within the geographical location where the application is allowed to run, automatically stopping the application by disabling the virtualization layer.

In at least one embodiment, the application is stored to a read-only sublayer of the virtualization layer and the data is stored to a plurality of read-write sublayers of the virtualization layer. In such embodiments, the method may further include, for each read-write sublayer in the plurality of sublayers 1) maintaining a virtualization-layer activation policy that associates a geographical location with the data in the read-write sublayer, 2) if the current location of the computing system is within the geographical location associated with the data in the read-write sublayer, enabling the read-write sublayer to allow access to the data in the read-write sublayer, and 3) if the current location of the computing system is not within the geographical location associated with the data in the read-write sublayer, disabling the read-write sublayer to prohibit access to the data in the read-write sublayer.

In one embodiment, a system for implementing the above-described method may include 1) a virtualization subsystem programmed on a computing system, the computing system having a base file system and base registry of a base operating system, 2) an installation module programmed to install an application and/or data to a virtualization layer on the computing system without changing the base file system and/or base registry such that the virtualization layer is isolated from the base file system and/or base registry, 3) a geolocation module programmed to identify a current geographical location of the computing system, 4) a determination module programmed to determine, based on the current geographical location of the computing system, whether the virtualization layer should be enabled such that access attempts associated with the application and/or data are redirected to the virtualization layer or should be disabled such that access attempts associated with the application and/or data are allowed to pass through to the base file system and/or base registry, and 5) at least one processor configured to execute the virtualization subsystem, the installation module, the geolocation module, and the determination module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) maintain an application virtualization subsystem on a computing system, the computing system having a base file system and base registry of a base operating system, 2) install an application and/or data to a virtualization layer on the computing system without changing the base file system and/or base registry such that the virtualization layer is isolated from the base file system and/or base registry, 3) identify a current geographical location of the computing system, and 4) determine, based on the current geographical location of the computing system, whether the virtualization layer should be enabled such that access attempts associated with the application and/or data are redirected to the virtualization layer or should be disabled such that access attempts associated with the application and/or data are allowed to pass through to the base file system and/or base registry.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Embodiments of the instant disclosure may provide a computing device with virtualization layers that are enabled and/or disabled based on a geographical location of the computing device. By implementing location-aware virtualization layers, the systems and methods described herein may prevent a user from unknowingly breaking a law, may protect sensitive data against being inadvertently or intentionally leaked, may facilitate resource provisioning and control for IT administrators, may provide parents with an effective location-based parental control mechanism, and/or may provide various other advantages and features.

Figure 1:
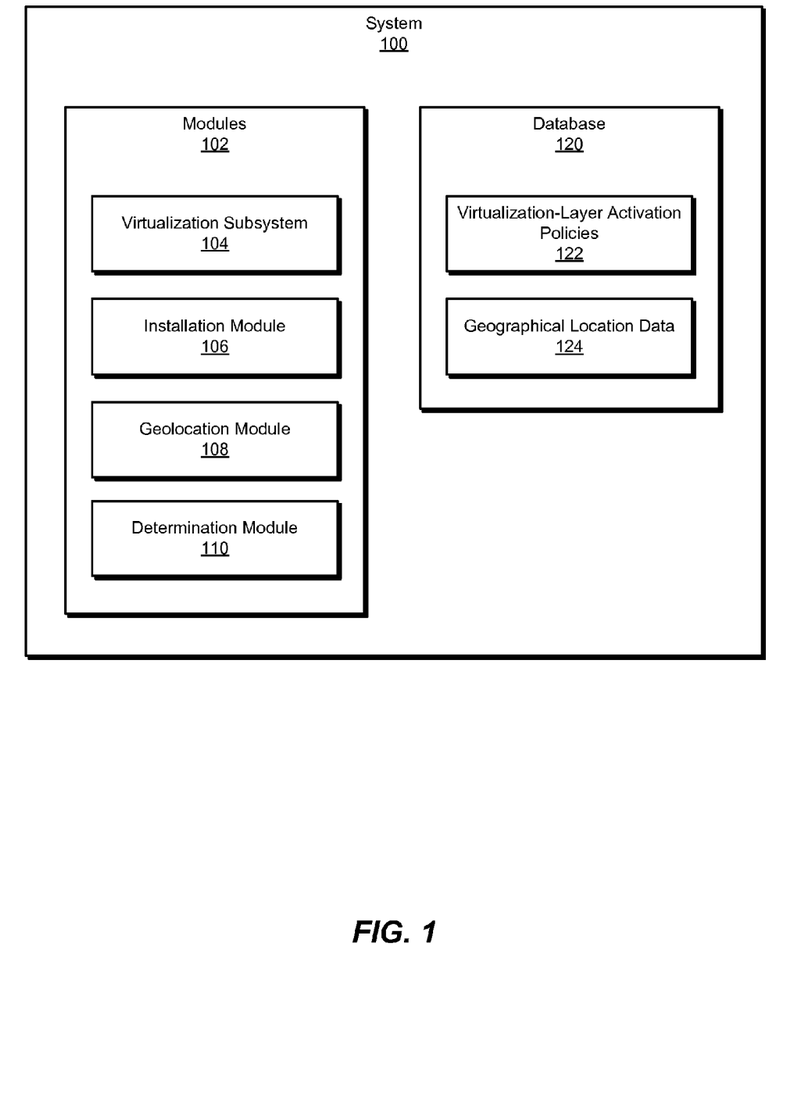
FIG. 1 is a block diagram of an exemplary system for maintaining location-aware virtualization layers.
Figure 2:
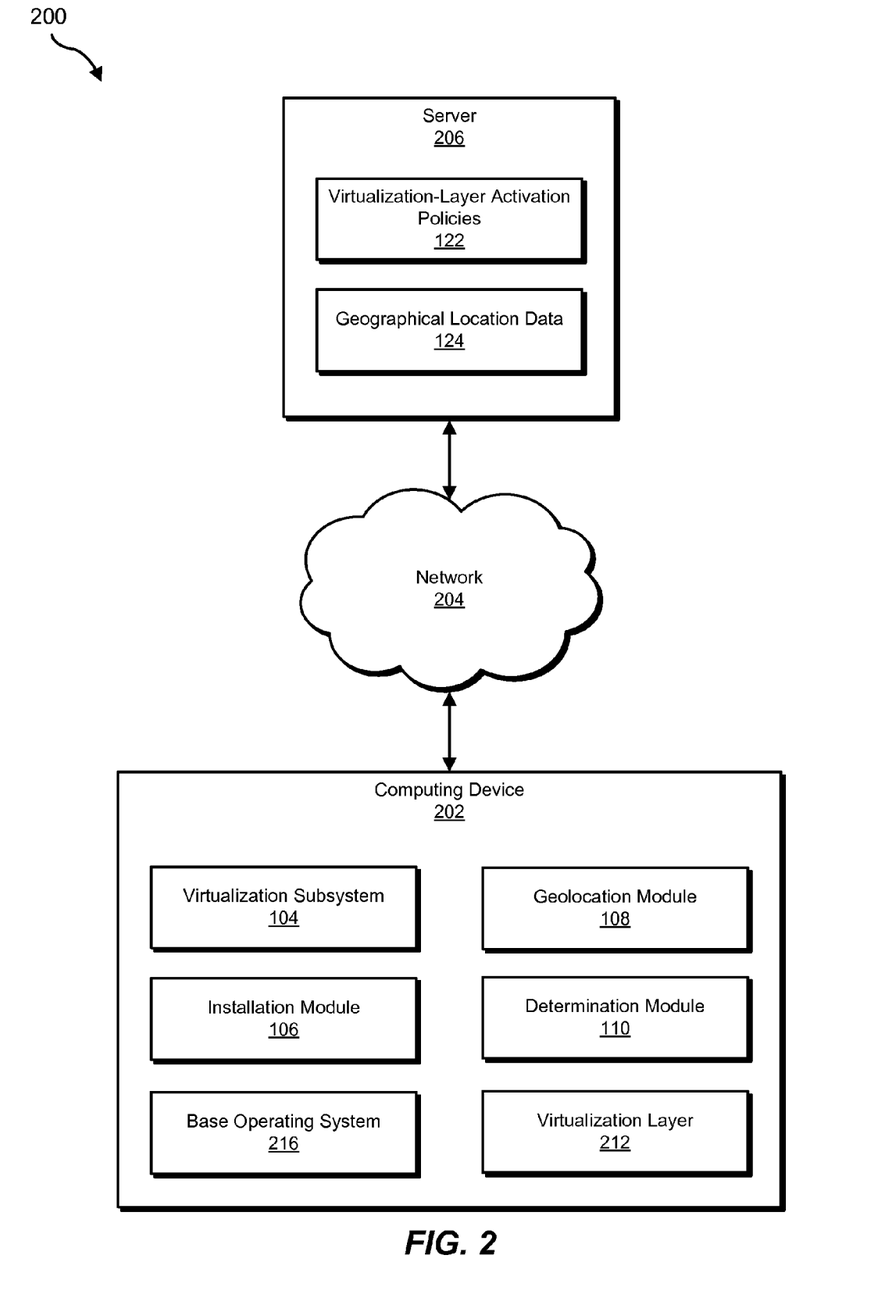
FIG. 2 is a block diagram of an exemplary system for maintaining location-aware virtualization layers.

The following will provide, with reference to FIGS. 1-2, detailed descriptions of exemplary systems for maintaining location-aware virtualization layers. Detailed descriptions of corresponding computer-implemented methods will also be provided in connection with FIG. 3. Descriptions of an exemplary virtualization subsystem are provided in connection with FIG. 4, and descriptions of exemplary geographical location boundaries are provided in connection with FIGS. 5 and 6. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for maintaining location-aware virtualization layers. As illustrated in this figure, exemplary system 100 may include one or more modules 102 for performing one or more tasks. For example, and as will be explained in greater detail below, exemplary system 100 may include a virtualization subsystem 104 programmed to activate and/or deactivate virtualization layers. System 100 may also include an installation module 106 programmed to install an application and/or data to a virtualization layer on the computing system without changing the base file system and/or base registry such that the virtualization layer is isolated from the base file system and/or base registry.

In addition, and as will be described in greater detail below, exemplary system 100 may include a geolocation module 108 programmed to identify a current geographical location of the computing system. System 100 may also include a determination module 110 programmed to determine, based on the current geographical location of the computing system, whether the virtualization layer should be enabled such that access attempts associated with the application and/or data are redirected to the virtualization layer or should be disabled such that access attempts associated with the application and/or data are allowed to pass through to the base file system and/or base registry. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store virtualization-layer activation policies 122 that indicate geographical locations where virtualization layers should be activated and/ or deactivated. Database 120 may also include geographical location data 124 that may identify current geographical locations of one or more computing devices.

Database 120 may represent portions of a single database or computing device or a plurality of databases or computing devices. For example, database 120 may represent a portion of server 206 in FIG. 2, computing system 710 in FIG. 7, and/or portions of exemplary network architecture 800 in FIG. 8. Alternatively, database 120 in FIG. 1 may represent one or more physically separate devices capable of being accessed by a computing device, such as server 206 in FIG. 2, computing system 710 in FIG. 7, and/or portions of exemplary network architecture 800 in FIG. 8.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204.

In one embodiment, one or more of modules 102 from FIG. 1 may, when executed by at least one processor of computing device 202, enable computing device 202 to maintaining location-aware virtualization layers. For example, and as will be described in greater detail below, computing device 202 may include virtualization subsystem 104, installation module 106, geolocation module 108, and determination module 110. Computing device 202 may also include base operating system 216 and virtualization layer 212. In the example shown in FIG. 2, computing device 202 may access server 206 to identify virtualization-layer activation policies 122 and/or geographical location data 124.

In some examples, computing device 202 may be an employee's device and server 206 may be managed by an employer or a third-party service provider. As another example, computing device 202 may be a child's device and server 206 may be part of a parental-control management system. In other embodiments, computing device 202 may be a user's device and server 206 may provide cloud-based support for virtualization services employed by the user.

While FIG. 2 shows virtualization subsystem 104, installation module 106, geolocation module 108, and determination module 110 in computing device 202, one or more of these modules may be located on server 206 and/or on another remote system. Similarly, virtualization-layer activation policies 122 and geographical location data 124 may be located on computing device 202 instead of server 206.

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 710 in FIG. 7, or any other suitable computing device.

Server 206 generally represents any type or form of computing device that is capable of maintaining and/or managing location-aware virtualization layers. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 800 in FIG. 8, or the like. Network 204 may facilitate communication or data transfer using wireless or wired connections. In one embodiment, network 204 may facilitate communication between computing device 202 and server 206.

Figure 3:
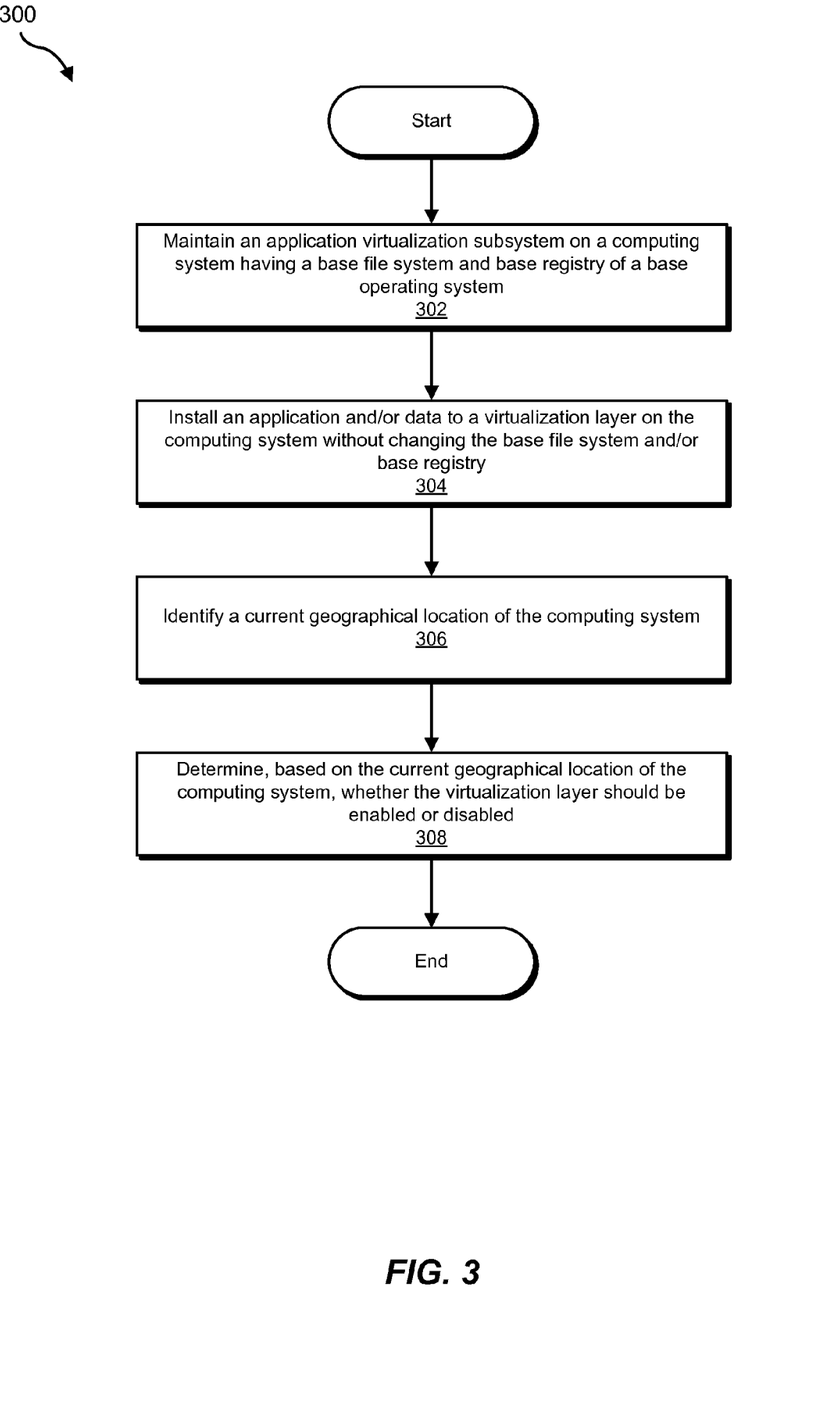
FIG. 3 is a flow diagram of an exemplary method for maintaining location-aware virtualization layers.

FIG. 3 is a flow diagram of an exemplary computer-implemented method 300 for maintaining location-aware virtualization layers. The steps shown in FIG. 3 may be performed by any suitable computer-executable code and/or computing system. In some embodiments, the steps shown in FIG. 3 may be performed by one or more of the components of exemplary system 100 in FIG. 1, exemplary system 200 in FIG. 2, exemplary computing system 710 in FIG. 7, and/or portions of exemplary network architecture 800 in FIG. 8.

At step 302, one or more of the systems described herein may maintain an application virtualization subsystem on a computing system having a base file system and base registry of a base operating system. For example, computing device 202 may include virtualization subsystem 104, a base file system, and a base registry.

A virtualization subsystem may be maintained on a computing device in a variety of contexts. For example, an IT administrator may deploy virtualization subsystem 104 to devices managed by the IT administrator to facilitate compliance objectives, data-loss-prevention, license management, and/or for a variety of other reasons. Alternatively, a parent may install virtualization subsystem 104 to a child's computing device to enable the parent to control applications and/or data accessed by the child in different locations. In some embodiments, a user may install virtualization subsystem 104 to his or her computing device to facilitate data and/or application management.

Figure 4:
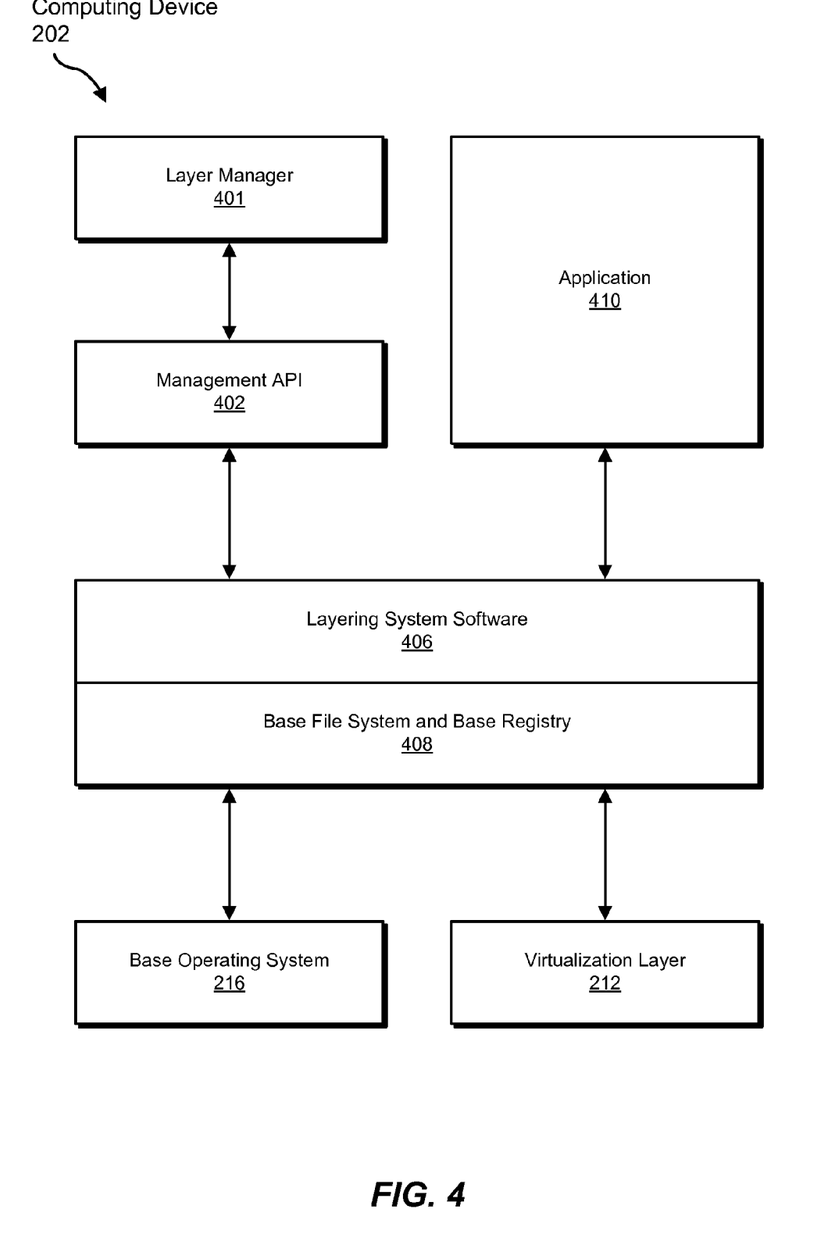
FIG. 4 is a block diagram of a conceptual arrangement of virtualization components on a computing system.

A virtualization subsystem may be maintained on a computing system in any suitable manner. For example, virtualization subsystem 104 may be installed, updated, configured, and/or otherwise managed on computing device 202 and may create and control virtualization layers on computing device 202. FIG. 4 shows an example of how virtualization subsystem 104 may be implemented. For example, virtualization subsystem 104 may include a layer manager (e.g., layer manager 401 and/or layering system software 406 in FIG. 4) and/or any other code that facilitates virtualization.

FIG. 4 shows a conceptual organization of components of computing device 202 with virtualization subsystem components installed. FIG. 4 shows that, in addition to base operating system 216 and virtualization layer 212, computing device 202 may include layer manager 401, a management Application Programming Interface ("API") 402, layering system software 406, a base file system and base registry 408, and an application 410. Base operating system 216 may form a platform with which applications may be executed and from which files may be accessed in file systems. Base operating system 216 may include registry settings in base file system and base registry 408, which may be globally available to applications for reading and writing. Computing system 202 may include base file system and base registry 408 for executing the functions of base operating system 216. Base file system and base registry 408 may include operating system files and registry entries. Layering system software 406 may be tied to base file system and base registry 408. Layering system software 406 may interpret file system and registry accesses from application 410. Layer manager 401 may create a virtualization layer (e.g., virtualization layer 212) to which settings, data, and/or software may be installed, and layering system software 406 may redirect one or more file system or registry calls from application 410 to virtualization layer 212.

When virtualization layer 212 is enabled, the contents of virtualization layer 212 may overlay any corresponding files of base file system and base registry 408. Layering system software 406 may present base operating system 216 with an expected, ordinary view of data of the contents of virtualization layer 212 when virtualization layer 212 is enabled by intercepting and manipulating file system calls to create the appearance that the contents of virtualization layer 212 are from base file system and base registry 408. For example, file and registry calls may be manipulated by redirecting the calls to virtualization layer 212 rather than base file system and base registry 408. If virtualization layer 212 is activated (i.e., enabled), layering system software 406 may redirect such calls to virtualization layer 212. If virtualization layer 212 is not activated (i.e., disabled), layering system software 406 may allow such calls to pass through to base operating system 216 or may respond to such calls by indicating that the requested data and/or application is not available.

Returning to FIG. 3, at step 304, one or more of the systems described herein may install an application and/or data to a virtualization layer on the computing system without changing the base file system and/or base registry such that the virtualization layer is isolated from the base file system and/or base registry. For example, virtualization subsystem 104 may install application 410 and/or data associated with application 410 (e.g., application data, settings, etc.) to virtualization layer 212 of computing device 202.

Virtualization subsystem 104 may install data and/or software to virtualization layer 212 on computing device 202 such that virtualization layer 212 is isolated from base file system and base registry 408. In this manner, the components installed to virtualization layer 212 may be used without affecting base file system and base registry 408. For example, a virtualization layer may overlay software and/or data that is already installed in base file system and base registry 408 without affecting the components already installed in base file system and base registry 408. Alternatively, virtualization subsystem 104 may install one or more components to virtualization layer 212 that do not have corresponding components in base file system and base registry 408. In such embodiments, software and/or data installed to virtualization layer 212 may not be available when virtualization layer 212 is not activated.

Virtualization subsystem 104 may install data and/or software to virtualization layer 212 in a variety of different contexts. For example, an IT administrator may install confidential data to virtualization layer 212 such that the confidential data may only be accessed in certain locations. An IT administrator may also install an application that is only licensed for use in particular locations to virtualization layer 212. As another example, a parent may install a set of location-specific parental-control settings to virtualization layer 212. Various other types of data and software may also be stored to virtualization layer 212, as discussed in greater detail below.

At step 306 in FIG. 3, one or more of the systems described herein may identify a current geographical location of the computing system. For example, geolocation module 108 may determine a current geographical location of computing device 202. Geolocation module 108 may determine a current geographical location of computing device 202 in any suitable manner. For example, geolocation module 108 may query a Global Positioning System (GPS) component of computing device 202 for GPS coordinates of computing device 202. Additionally or alternatively, geolocation module 108 may use cell-phone tower triangulation to identify the current geographical location of computing device 202. As another example, geolocation module 108 may identify the current location of computing device 202 by determining a network (e.g., a wifi network, a Bluetooth network, a cellular network, etc.) to which computing device 202 is connected. In some embodiments, geolocation module 108 may use Radio Frequency Identification (RFID) to determine the current geographical location of computing device 202. Geolocation module 108 may also determine the current geographical location of computing device 202 in any other suitable manner.

At step 308 in FIG. 3, one or more of the systems described herein may determine, based on the current geographical location of the computing system, whether the virtualization layer should be enabled such that access attempts associated with the application and/or data are redirected to the virtualization layer or should be disabled such that access attempts associated with the application and/or data are allowed to pass through to the base file system and/or base registry. For example, determination module 110 may determine whether virtualization layer 212 should be enabled based on the current geographical location of computing device 202.

Determination module 110 may determine whether to enable or disable virtualization layer 212 in a variety of ways. For example, determination module 110 may access, in database 120, a virtualization-layer activation policy that associates a geographical location with the application and/or data in the virtualization layer. A virtualization-layer activation policy may be any policy, setting, tag, metadata, or other information that indicates one or more geographical locations where access to data and/or an application is allowed or prohibited. Virtualization layer policies may be stored in a database (e.g., database 120), a location-index table, as metadata of a virtualization layer or file, and/or in any other manner that associates the policies with corresponding and/or software. Determination module 110 may use a virtualization-layer activation policy to determine whether virtualization layer 212 should be activated or deactivated by determining whether the current geographical location of the computing system is within the geographical location associated with the application and/or data in the virtualization layer in the policy.

In some embodiments, determination module 110 may direct virtualization subsystem 104 to enable virtualization layer 212 if the current location of computing device 202 is within the geographical location associated with the application and/or data in the virtualization layer. Alternatively, determination module 110 may direct virtualization subsystem 104 to disable virtualization layer 212 if the current location of computing device 202 is not within the geographical location associated with the application and/or data in the virtualization layer.

In some embodiments, determination module 110 may periodically (e.g., every ten minutes, every hour, once a day) check the geographical location of computing device 202. After determining the geographical location of computing device 202, determination module 110 may check any virtualization-layer activation policies associated with data and/or applications of computing device 202 to determine whether any virtualization layers should be enabled or disabled based on the current geographical location. Alternatively, determination module 110 may be prompted to determine whether a virtualization layer should be enabled or disabled in response to a request to access an application and/or data stored in a virtualization layer.

In some embodiments, determination module 110 may identify an attempt to launch an application and may determine that a virtualization layer storing the application should be enabled because the current geographical location of the computing system is within a geographical location where the application is allowed to run. In this situation, determination module 110 may direct virtualization subsystem 104 to enable the virtualization layer to allow the application to launch. If determination module 110 determines that the computing system is no longer within the geographical location where the application is allowed to run, determination module 110 may automatically stop the application by directing virtualization subsystem 110 to disable the virtualization layer.

For example, a virtualization layer activation policy may indicate that an instant messaging client installed to virtualization layer 212 may be legal in a country of origin but illegal in other countries. In this example, when computing device 202 is in the country of origin, determination module 110 may direct virtualization subsystem 104 to activate virtualization layer 212 to enable access to the instant messaging client. However, when computing device 202 leaves the country of origin, determination module 110 may determine, based on the current geographical location of computing device 202 and the virtualization layer activation policy, that computing device 202 is no longer in a location where access to the instant messaging client is allowed. As a result, determination module 110 may direct virtualization subsystem 104 to disable virtualization layer 212 to prevent access to the instant messaging client.

Virtualization-layer activation policies may define various types of geographical boundaries. In some exemplary embodiments, the geographical boundaries defined by a policy may correspond to cities, states, countries, physical buildings, and/or property boundaries. The geographical boundaries defined by a policy may also be network boundaries indicating that data and/or applications may only be accessed within (or cannot be accessed within) a particular wide area network, local area network, cellular network, Bluetooth network, or any other wireless or wired network.

Figure 5:
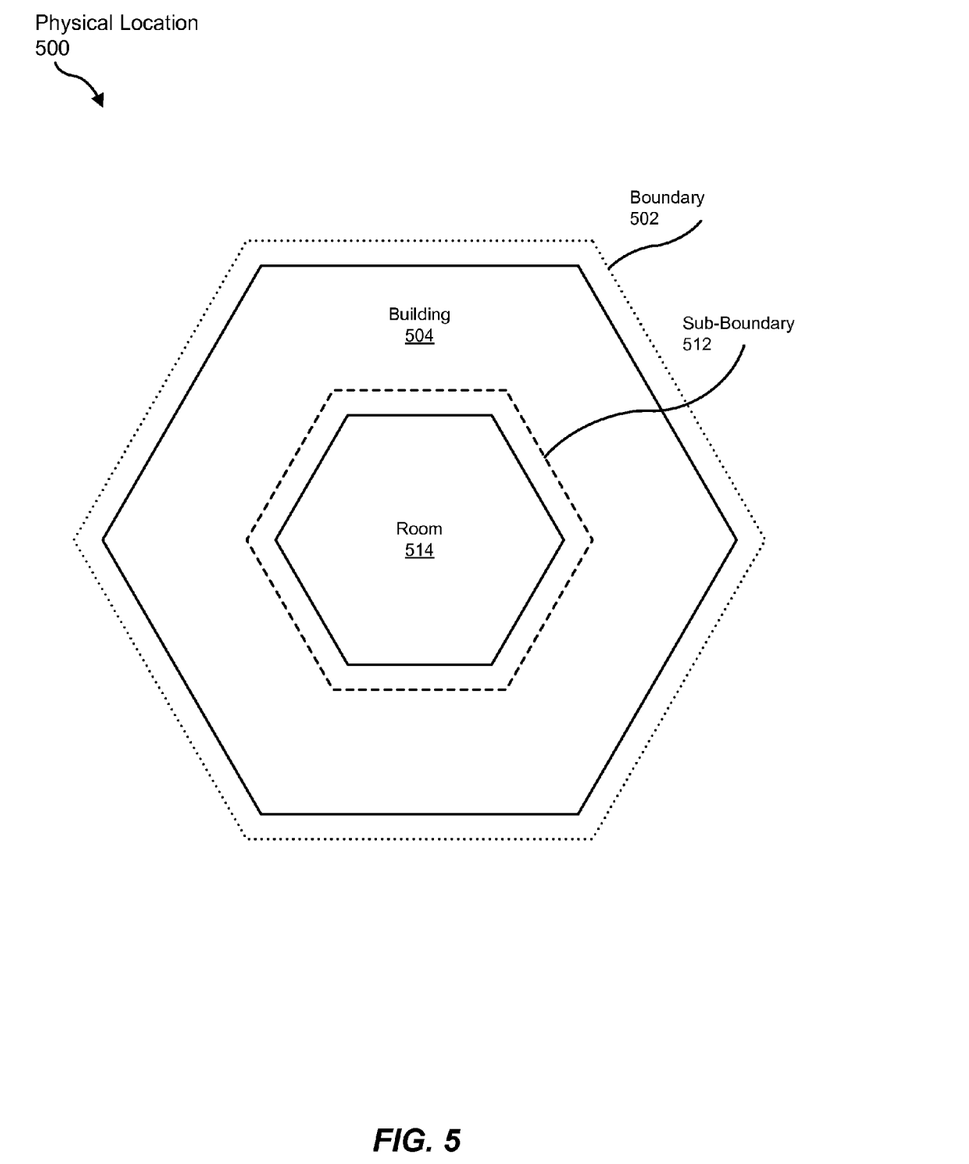
FIG. 5 is a block diagram of exemplary geographical boundaries.

In certain embodiments, a sub-region may be identified within a geographical location. As an example, FIG. 5 illustrates a first physical location 500 and a sub-region located within the first physical location. A boundary 502 may be defined to encompass a building 504. A sub-boundary 512 may be defined to encompass a room 514 within building 504. In one example, building 504 may be a school and room 514 may be the library of the school. A first policy may define that a child is not allowed to access the internet on a smartphone while at school. Thus, a virtualization layer that includes an internet browser application may be disabled when the child carries the phone into the school (i.e., within boundary 502).

Continuing with the previous example, a second policy may indicate that the child cannot send or receive calls while in the library (i.e., within sub-boundary 512). Thus, a virtualization layer with a setting that disables the cellular antenna of the child's phone may be activated when the child enters the library and deactivated when the child leaves the library.

As another example, building 504 may be an office building of a corporation, and room 514 may be a conference room within the office building. An IT administrator for the corporation may set up a policy that indicates classified information can only be accessed within the office building and highly classified information can only be accessed within the conference room. The IT administrator may load classified information into a first virtualization layer on an employee's laptop and may associate the first virtualization layer with the policy that restricts data access to the office building. The IT administrator may also load highly classified information into a second virtualization on the employee's laptop and may associate the second virtualization layer with the policy that restricts data access to the conference room.

Continuing with the previous example, when the employee enters the office building, the first virtualization layer may be enabled, thereby allowing access to the classified data. When the employee leaves the office building, the first virtualization layer may be disabled to prevent access to the classified data outside the office building. Similarly, when the employee enters the conference room, the second virtualization layer may be enabled, thereby allowing access to the highly classified data. When the employee leaves the conference room, the second virtualization layer may be disabled to prevent access to the highly classified data outside the conference room. In this manner, embodiments of the instant disclosure may facilitate data loss prevention.

Embodiments of the instant disclosure may also facilitate data loss prevention on a stationary device (e.g., desktop computer, workstation, etc.) and/or mobile device by deactivating virtual layers containing sensitive data and/or applications if the device is removed from a building (e.g., inadvertently or as a result of theft), when a device is moved more than a predefined distance from a geographical location, and/or in a variety of other situations.

Geographical locations identified in virtualization layer activation policies may be defined by a boundary of any shape or size. In some embodiments, a boundary box may be defined using two geographical coordinates (e.g., latitude and longitude coordinates). A boundary may also be defined with more than two geographical coordinates, which may be useful in creating boundaries unique to the various shapes of physical locations.

Figure 6:
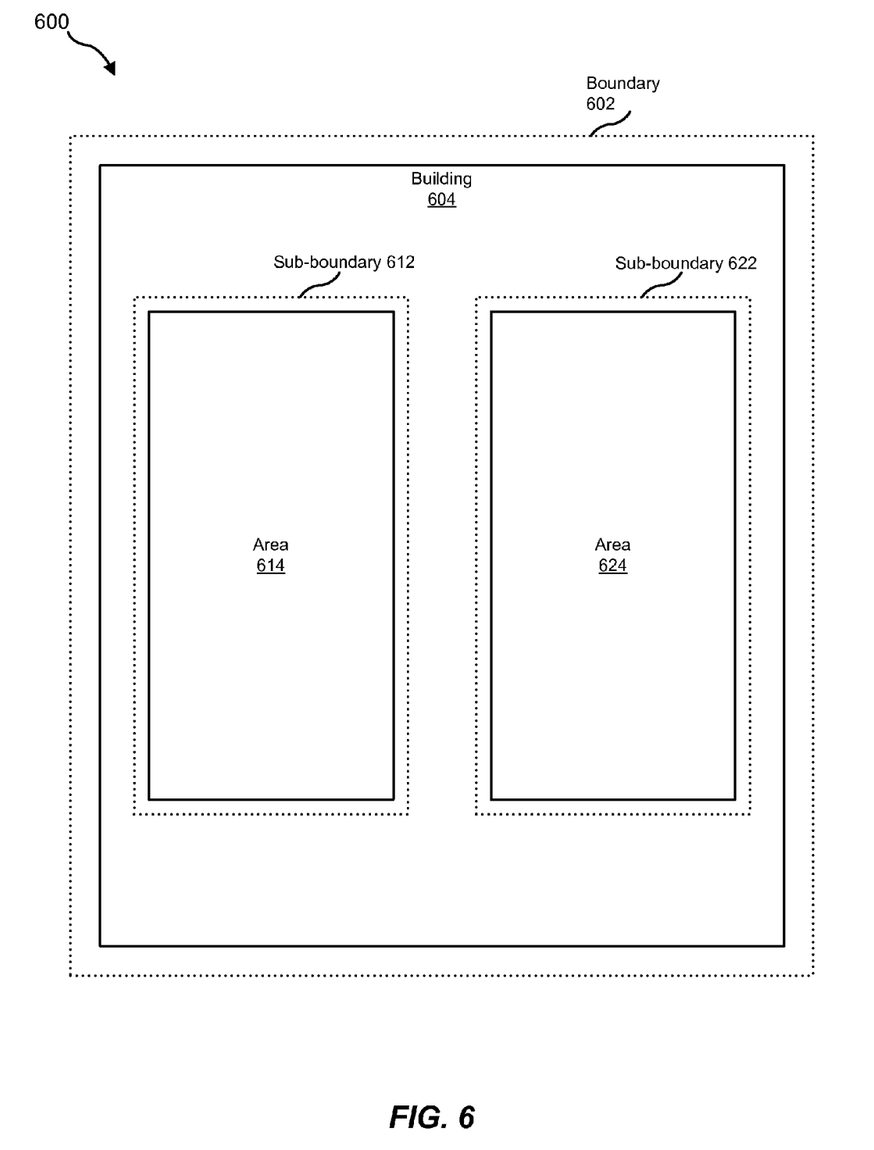
FIG. 6 is another block diagram of exemplary geographical boundaries.

In some embodiments, a first physical location may include more than one sub-region. FIG. 6 illustrates an exemplary location with multiple sub-regions. FIG. 6 illustrates a real-world location 600. Real-world location 600 may include a boundary 602 defined to be around a building 604. A sub-boundary 612 may be defined around an area 614, and a sub-boundary 622 may be defined around an area 624.

In one embodiment, real-world location 600 may be a hospital, area 614 may be a first patient's room, and area 624 may be a second patient's room. An administrator for the hospital may establish policies that control access to patient's data stored in a patient-record database. For example, the administrator may establish a policy that indicates doctors may only access the patient-record database within the hospital. The administrator may install patient-record database access software to a virtualization layer on a doctor's tablet device and may indicate that the virtualization layer should only be activated when the device is within the hospital. Thus, if the doctor tried to access the software outside the hospital, the software would not run because the virtualization layer where the software is installed would be deactivated.

The administrator may also create policies that prohibit the doctor from accessing records of other patients while the doctor is in a current patient's room. In this example, the records for each of the doctor's patients may be stored to different virtualization layers, and the virtualization layer with a particular set of records may only be activated when the doctor enters a hospital room of a patient associated with the particular set of records. For example, if the doctor carries his tablet into a patient's room and accidentally tries to access records of a different patient, access will be denied because the virtualization layer containing the records of the different patient will not be enabled. In this manner, the doctor may be prevented from accidentally exposing records of one patient to another patient and may avoid violating health-care privacy laws.

In some embodiments, data and/or software may be installed to virtualization sublayers of a virtualization layer. For example, an application may be stored to a read-only sublayer of the virtualization layer, and data associated with the application may be stored to one or more of a plurality of read-write sublayers of the virtualization layer. In this embodiment, for each read-write sublayer in the plurality of sublayers, the system described herein may maintain a virtualization-layer activation policy that associates a geographical location with data in the read-write sublayer. If the current location of the computing system is within the geographical location associated with the data in a read-write sublayer, the read-write sublayer may be enabled to allow access to the data in the read-write sublayer. If the current location of the computing system is not within the geographical location associated with the data in the read-write sublayer, the read-write sublayer may be disabled to prohibit access to the data in the read-write sublayer. For example, the patient-record database access software of the hospital in the previous example may be installed to a read-only sublayer and patient data may be stored to different read-write sublayers for each patient.

A read-only sublayer may include any sublayer that one or more users is prohibited from modifying. For example, a read-only sublayer may include a sublayer that may only be modified by an administrator. A read-only sublayer may provide a base state for an application installation. In contrast, a read-write sublayer may be configured to capture application changes made by users who are prohibited from modifying the read-only sublayer.

Figure 7:
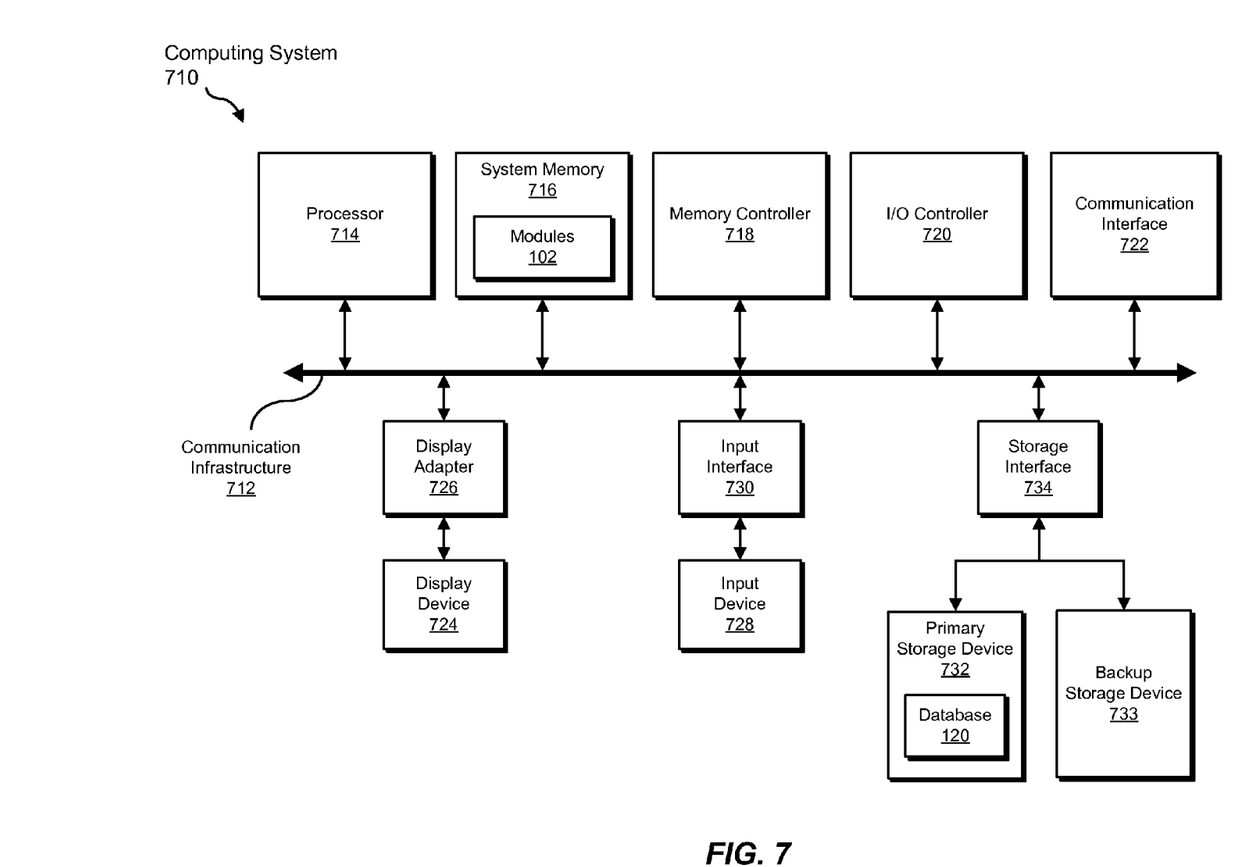
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the maintaining, installing, identifying, determining, enabling, and disabling steps described herein. All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, database 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 710. All or a portion of the computer program stored on the computer-readable-storage medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
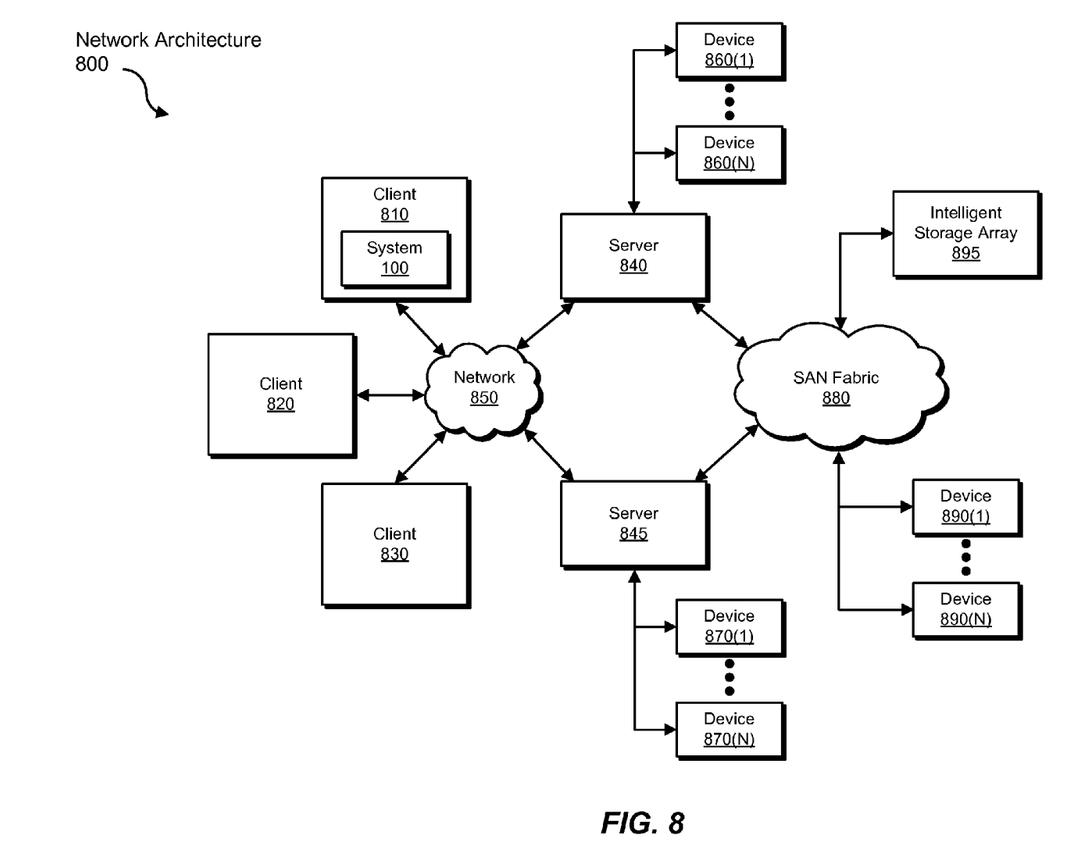
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the maintaining, installing, identifying, determining, enabling, and disabling steps disclosed herein. All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for maintaining location-aware virtualization layers.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform storage and/or functionality of a computing system by enabling and/or disabling virtualization layers on the computing system based on a physical location of the computing system.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for maintaining location-aware virtualization layers, at least a portion of the method being performed by a computing device comprising at least one processor, the method comprising:

maintaining an application virtualization subsystem on a computing system having a base file system and base registry of a base operating system;

installing an application and/or data to a virtualization layer on the computing system without changing the base file system and/or base registry such that the virtualization layer is isolated from the base file system and/or base registry;

periodically identifying a current geographical location of the computing system;

determining that the computing system has entered a geographical location where the application is prohibited from running according to a virtualization-layer activation policy that defines longitude and latitude coordinates where the virtualization layer should be deactivated to prevent a user of the computing system from accessing the application and/or data on the same computing system;

in response to the determination that the computing system has entered the geographical location where the application is prohibited from running, automatically stopping the application by disabling the virtualization layer such that access attempts associated with the application and/or data are allowed to pass through to the base file system and/or base registry;

when the computing system leaves the geographical location, determining that the computing system is no longer within the geographical location where the application is prohibited from running;
in response to the determination that the computing system is no longer within the geographical location where the application is prohibited from running, enabling the virtualization layer such that access attempts associated with the application and/or data are redirected to the virtualization layer.

2. The computer-implemented method of claim 1, further comprising maintaining the virtualization-layer activation policy that associates the geographical location where the application is prohibited from running with the application and/or data in the virtualization layer.

3. The computer-implemented method of claim 1, wherein periodically identifying the current geographical location of the computing system comprises identifying the geographical location of the computing system at least once an hour.

4. The computer-implemented method of claim 1, further comprising identifying an attempt to access the application and/or data in the virtualization layer, wherein enabling or disabling the virtualization layer is performed in response to the attempt to access the application and/or data in the virtualization layer.

5. The computer-implemented method of claim 4, wherein:
identifying the attempt to access the application in the virtualization layer comprises detecting an attempt to launch the application;
enabling the virtualization layer comprises enabling the virtualization layer to allow the application to launch.

6. The computer-implemented method of claim 1, further comprising:
maintaining the virtualization-layer activation policy that associates the geographical location where the application is prohibited from running with the application and/or data in the virtualization layer;
identifying at least one sub-region within the geographical location where the application is prohibited from running;
maintaining a second virtualization-layer activation policy that associates the sub-region within the geographical location with a second application and/or second data set in a second virtualization layer;
determining that the computing system has entered the sub-region within the geographical location;
in response to the determination that the computing system has entered the sub-region within the geographical location, disabling the second virtualization layer;
when the computing system leaves the sub-region within the geographical location, determining that the computing system is no longer within the sub-region of the geographical location;
in response to the determination that the computing system is no longer within the sub-region of the geographical location, automatically allowing access to the second data set by enabling the second virtualization layer.

7. The computer-implemented method of claim 1, wherein:
the application is stored to a read-only sublayer of the virtualization layer;
the data is stored to a plurality of read-write sublayers of the virtualization layer;
the method further comprises, for each read-write sublayer in the plurality of sublayers:
maintaining a virtualization-layer activation policy that associates a geographical location with data in the read-write sublayer;
if the current location of the computing system is within the geographical location associated with the data in the read-write sublayer, disabling the read-write sublayer to prevent access to the data in the read-write sublayer;
if the current location of the computing system is not within the geographical location associated with the data in the read-write sublayer, enabling the read-write sublayer to allow access to the data in the read-write sublayer.

8. A system for maintaining location-aware virtualization layers, the system comprising:
a virtualization subsystem programmed on a computing system, the computing system having a base file system and base registry of a base operating system;
an installation module programmed to install an application and/or data to a virtualization layer on the computing system without changing the base file system and/or base registry such that the virtualization layer is isolated from the base file system and/or base registry;
a geolocation module programmed to periodically identify a current geographical location of the computing system;
a determination module programmed to:
determine that the computing system has entered a geographical location where the application is prohibited from running according to a virtualization-layer activation policy that defines longitude and latitude coordinates where the virtualization layer should be deactivated to prevent a user of the computing system from accessing the application and/or data on the same computing system;
in response to the determination that the computing system has entered the geographical location where the application is prohibited from running, automatically stop the application by disabling the virtualization layer such that access attempts associated with the application and/or data are allowed to pass through to the base file system and/or base registry;
when the computing system leaves the geographical location, determine that the computing system is no longer within the geographical location where the application is prohibited from running;
in response to the determination that the computing system is no longer within the geographical location where the application is prohibited from running, enable the virtualization layer such that access attempts associated with the application and/or data are redirected to the virtualization layer;
at least one processor configured to execute the virtualization subsystem, the installation module, the geolocation module, and the determination module.

9. The system of claim 8, further comprising a policy module programmed to maintain the virtualization-layer activation policy that associates the geographical location where the application is prohibited from running with the application and/or data in the virtualization layer.

10. The system of claim 8, wherein the geolocation module is programmed to periodically identify the current geographical location of the computing system by identifying the geographical location of the computing system at least once an hour.

11. The system of claim 8, further comprising a filter driver programmed to identify an attempt to access the application and/or data in the virtualization layer, wherein the determination module enables or disables the virtualization layer in response to the attempt to access the application and/or data in the virtualization layer.

12. The system of claim 11, wherein:
the filter driver is programmed to identify the attempt to access the application in the virtualization layer by detecting an attempt to launch the application;
the virtualization subsystem is programmed to enable the virtualization layer to allow the application to launch.

13. The system of claim 8, wherein:
a policy module is programmed to maintain the virtualization-layer activation policy that associates the geographical location where the application is prohibited from running with the application and/or data in the virtualization layer;
the geolocation module is further programmed to identify at least one sub-region within the geographical location where the application is prohibited from running;
the policy module is further programmed to maintain a second virtualization-layer activation policy that associates the sub-region within the geographical location with a second application and/or second data set in a second virtualization layer;
the determination module is further programmed to:
determine that the computing system has entered the sub-region within the geographical location;
in response to the determination that the computing system has entered the sub-region within the geographical location, disable the second virtualization layer;
when the computing system leaves the sub-region within the geographical location, determine that the computing system is no longer within the sub-region of the geographical location;
in response to the determination that the computing system is no longer within the sub-region of the geographical location, automatically allow access to the second data set by enabling the second virtualization layer.

14. The system of claim 8, wherein:
the application is stored to a read-only sublayer of the virtualization layer;
the data is stored to a plurality of read-write sublayers of the virtualization layer;
the virtualization subsystem is programmed to, for each read-write sublayer in the plurality of sublayers:
maintain a virtualization-layer activation policy that associates a geographical location with data in the read-write sublayer;
if the current location of the computing system is within the geographical location associated with the data in the read-write sublayer, disable the read-write sublayer to prevent access to the data in the read-write sublayer;
if the current location of the computing system is not within the geographical location associated with the data in the read-write sublayer, enable the read-write sublayer to allow access to the data in the read-write sublayer.

15. A non-transitory computer-readable-storage medium comprising one or more computer-executable instructions that, when executed by at least one processor of a computing device, cause the computing device to:
maintain an application virtualization subsystem on a computing system, the computing system having a base file system and base registry of a base operating system;
install an application and/or data to a virtualization layer on the computing system without changing the base file system and/or base registry such that the virtualization layer is isolated from the base file system and/or base registry;
periodically identify a current geographical location of the computing system;
determine that the computing system has entered a geographical location where the application is prohibited from running according to a virtualization-layer activation policy that defines longitude and latitude coordinates where the virtualization layer should be deactivated to prevent a user of the computing system from accessing the application and/or data on the same computing system;
in response to the determination that the computing system has entered the geographical location where the application is prohibited from running, automatically stop the application by disabling the virtualization layer such that access attempts associated with the application and/or data are allowed to pass through to the base file system and/or base registry;
when the computing system leaves the geographical location, determine that the computing system is no longer within the geographical location where the application is prohibited from running;
in response to the determination that the computing system is no longer within the geographical location where the application is prohibited from running, enable the virtualization layer such that access attempts associated with the application and/or data are redirected to the virtualization layer.

16. The computer-readable-storage medium of claim 15, wherein the one or more computer-executable instructions further cause the computing device to maintain the virtualization-layer activation policy that associates the geographical location where the application is prohibited from running with the application and/or data in the virtualization layer.

17. The computer-readable-storage medium of claim 15, wherein the one or more computer-executable instructions further cause the computing device to periodically identify the current geographical location of the computing system by identifying the geographical location of the computing system at least once an hour.

18. The computer-readable-storage medium of claim 15, wherein the one or more computer-executable instructions further cause the computing device to:
identify, using an access driver, an attempt to access the application and/or data in the virtualization layer;
enable or disable the virtualization layer in response to the attempt to access the application and/or data in the virtualization layer.

19. The computer-readable-storage medium of claim 18, wherein:
identifying, using the access driver, the attempt to access the application and/or data in the virtualization layer comprises detecting an attempt to launch the application;
the application virtualization subsystem is programmed to enable the virtualization layer to allow the application to launch.

20. The computer-readable-storage medium of claim 15, wherein the one or more computer-executable instructions further cause the computing device to:
maintain the virtualization-layer activation policy that associates the geographical location where the application is prohibited from running with the application and/or data in the virtualization layer;
identify at least one sub-region within the geographical location where the application is prohibited from running;
maintain a second virtualization-layer activation policy that associates the sub-region within the geographical location with a second application and/or second data set in a second virtualization layer;

determine that the computing system has entered the sub-region within the geographical location;

in response to the determination that the computing system has entered the sub-region within the geographical location, disable the second virtualization layer;

when the computing system leaves the sub-region within the geographical location, determine that the computing system is no longer within the sub-region of the geographical location;

in response to the determination that the computing system is no longer within the sub-region of the geographical location, automatically allow access to the second data set by enabling the second virtualization layer.

* * * * *